(12) United States Patent
VanBlon et al.

(10) Patent No.: US 11,138,296 B2
(45) Date of Patent: Oct. 5, 2021

(54) DIGITAL CONTENT VALIDATION

(71) Applicant: Lenovo (Singapore) Pte. Ltd., Singapore (SG)

(72) Inventors: Russell Speight VanBlon, Raleigh, NC (US); Mark Patrick Delaney, Raleigh, NC (US); John Carl Mese, Cary, NC (US); Nathan J. Peterson, Oxford, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 168 days.

(21) Appl. No.: 16/290,022

(22) Filed: Mar. 1, 2019

(65) Prior Publication Data
US 2020/0279030 A1    Sep. 3, 2020

(51) Int. Cl.
*G06F 21/16* (2013.01)

(52) U.S. Cl.
CPC ...... *G06F 21/16* (2013.01); *G06F 2221/0737* (2013.01)

(58) Field of Classification Search
USPC ........................................................ 726/28
See application file for complete search history.

(56) References Cited

U.S. PATENT DOCUMENTS

| | | | | |
|---|---|---|---|---|
| 8,065,521 | B2* | 11/2011 | Peinado | H04L 9/0897 713/164 |
| 8,826,034 | B1* | 9/2014 | Kennedy | G06F 21/56 713/188 |
| 9,547,879 | B1* | 1/2017 | Rakowicz | G06Q 20/3829 |
| 2005/0060544 | A1* | 3/2005 | Huang | G06F 21/10 713/165 |
| 2006/0212363 | A1* | 9/2006 | Peinado | G06F 21/84 705/26.1 |
| 2008/0195871 | A1* | 8/2008 | Peinado | H04L 9/0825 713/189 |
| 2010/0227681 | A1* | 9/2010 | Soemo | A63F 13/12 463/29 |
| 2010/0235644 | A1* | 9/2010 | Oxford | H04L 9/3242 713/181 |
| 2010/0312810 | A1* | 12/2010 | Horton | G06F 21/10 707/812 |
| 2012/0143731 | A1* | 6/2012 | Ko | G06Q 30/0641 705/27.1 |
| 2018/0013699 | A1* | 1/2018 | Sapoznik | G06F 16/90332 |
| 2018/0268432 | A1* | 9/2018 | Smrzlic | G06Q 20/1235 |
| 2020/0162265 | A1* | 5/2020 | Jawaharlal | H04L 9/3236 |
| 2020/0279030 | A1* | 9/2020 | VanBlon | G06F 21/16 |

* cited by examiner

*Primary Examiner* — Firmin Backer
(74) *Attorney, Agent, or Firm* — Ference & Associates LLC

(57) ABSTRACT

One embodiment provides a method, including: generating, using an information handling device, digital content; providing an indication of the digital content to at least one other device; and receiving, from the at least one other device, a digital signature for the digital content. Other aspects are described and claimed.

16 Claims, 3 Drawing Sheets

DIGITAL CONTENT VALIDATION

BACKGROUND

Users may use information handling devices ("devices"), for example smart phones, tablet devices, laptop and personal computers, and the like, to produce a variety of different types of digital media content. For example, a user may use a smart phone or tablet to capture an image, take a video, record a song, etc. Subsequent to creation, the user may attach various pieces of information to the content (e.g., a content description, a location identifier, one or more hashtags, etc.) and thereafter upload their media to one or more social media sites for other individuals to see.

BRIEF SUMMARY

In summary, one aspect provides a method, comprising: generating, using an information handling device, digital content; providing an indication of the digital content to at least one other device; and receiving, from the at least one other device, a digital signature for the digital content.

Another aspect provides an information handling device, comprising: a processor; a memory device that stores instructions executable by the processor to: generate digital content; provide an indication of the digital content to at least one other device; and receive, from the at least one other device, a digital signature for the digital content.

A further aspect provides a method, comprising: receiving, at an information handling device, digital content transmitted by another device; signing the digital content with a digital signature; and transmitting the digital content signed with the digital signature to the another device.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
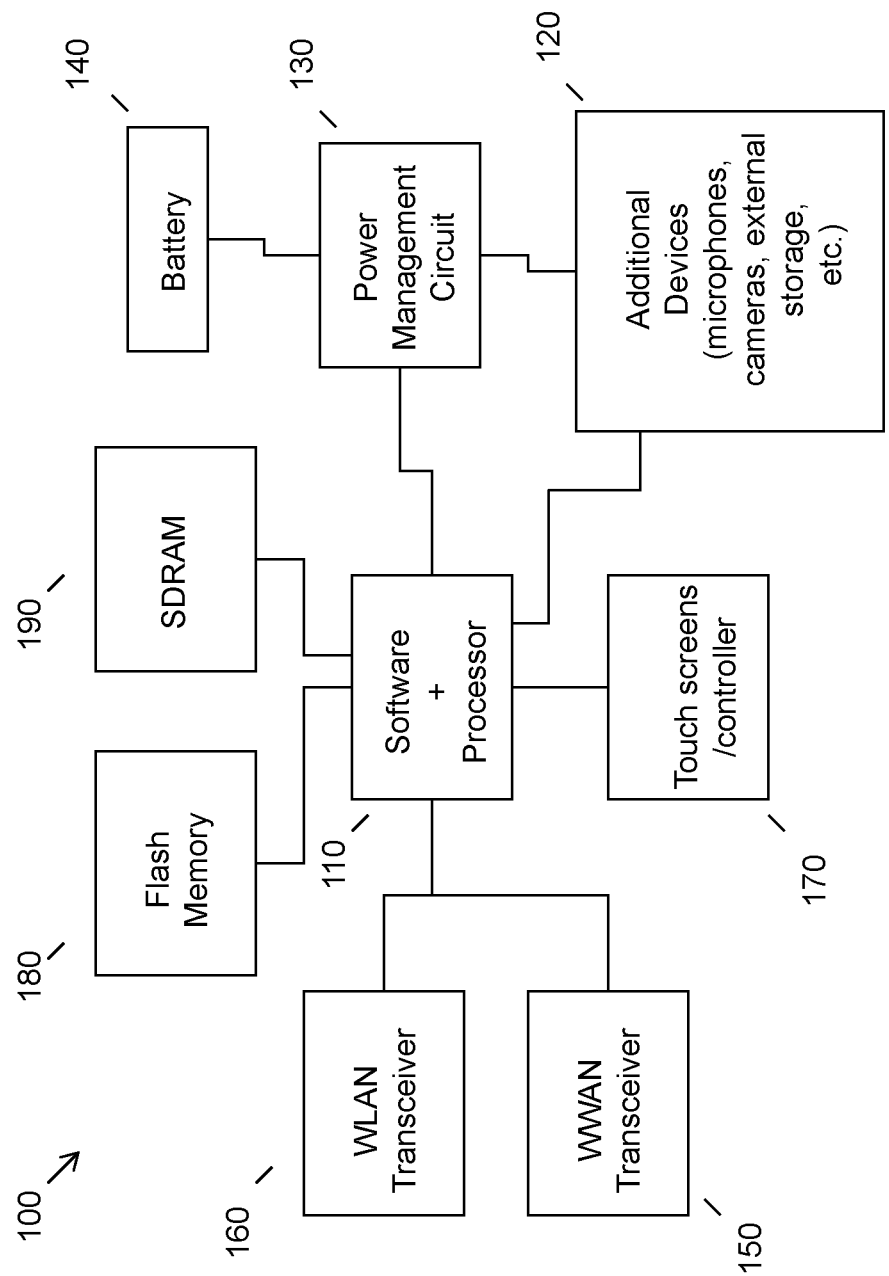
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Due in part to the prevalence of social media and its multiple platforms, digital media content in today's world is being produced at an accelerated rate. Many mechanisms exist for creators to easily capture photos, take videos, record songs, etc. and thereafter upload their content to one or more social media platforms. Once uploaded, other individuals may view the creator's content, comment on it, share it, like or dislike it, and the like.

An issue often encountered by creators is the stealing or plagiarizing of their content by other social media users. For example, a creator may upload a photograph they captured of a landscape. Seeing that the photograph was popular, other individuals may create a digital copy of the photograph and upload it to their accounts as well. Due to the amorphous nature of social media, it may be difficult to thereafter identify the original creator of the photograph. Accordingly, to ensure they receive credit for their work, many creators attach various types of identifying information to their content. For example, a content creator may sign a piece of digital media with: a visible signature appearing somewhere in or on the media, a watermark, another type of personal logo or emblem, and the like. Such a signature may make it more difficult for other individuals to steal the content creator's work without others knowing.

Unfortunately, sometimes the content creator may not be the best indicator of trust. For example, although an individual may be the real creator of a piece of content, the content may be heavily edited or other aspects associated with the content (e.g., the location of creation, etc.) may be misrepresented. A creator may be motivated to do this in an attempt to garner more social media views, which may correspondingly result in greater monetary profits, an increase in social standing (e.g., by presenting to the world they were present at a popular or important event, etc.), and the like. No solutions currently exist that readily identify whether various representations made by the content creator are accurate.

Accordingly, an embodiment allows nearby devices/users to validate content created by a content creator, thereby adding a trust factor that can later be validated by anyone. In an embodiment, digital content may be generated by or at a device. An embodiment may thereafter provide an indication of the digital content to at least one other device. For example, a device may transmit an indication to all devices within a predetermined radius that new content was created. Once this indication is received, the other devices may sign the content with a digital signature comprising various types of information (e.g., a creation time, a creation date, a location indicator, etc.). The digital signature may be transmitted back to the content-creating device and attached to the digital content. Such a method may allow content viewers to immediately identify whether one or more aspects associated with the digital media were spoofed. Additionally, digital content without a signature may be suspect to falsification, especially if it was created in a location where nearby signing were readily available.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., an image sensor such as a camera, audio capture device such as a microphone, motion sensor such as an accelerometer or gyroscope, a thermal sensor, etc. System 100 often includes one or more touch screens 170 for data input and display/rendering. System 100 also typically includes various memory devices, for example flash memory 180 and SDRAM 190.

Figure 2:
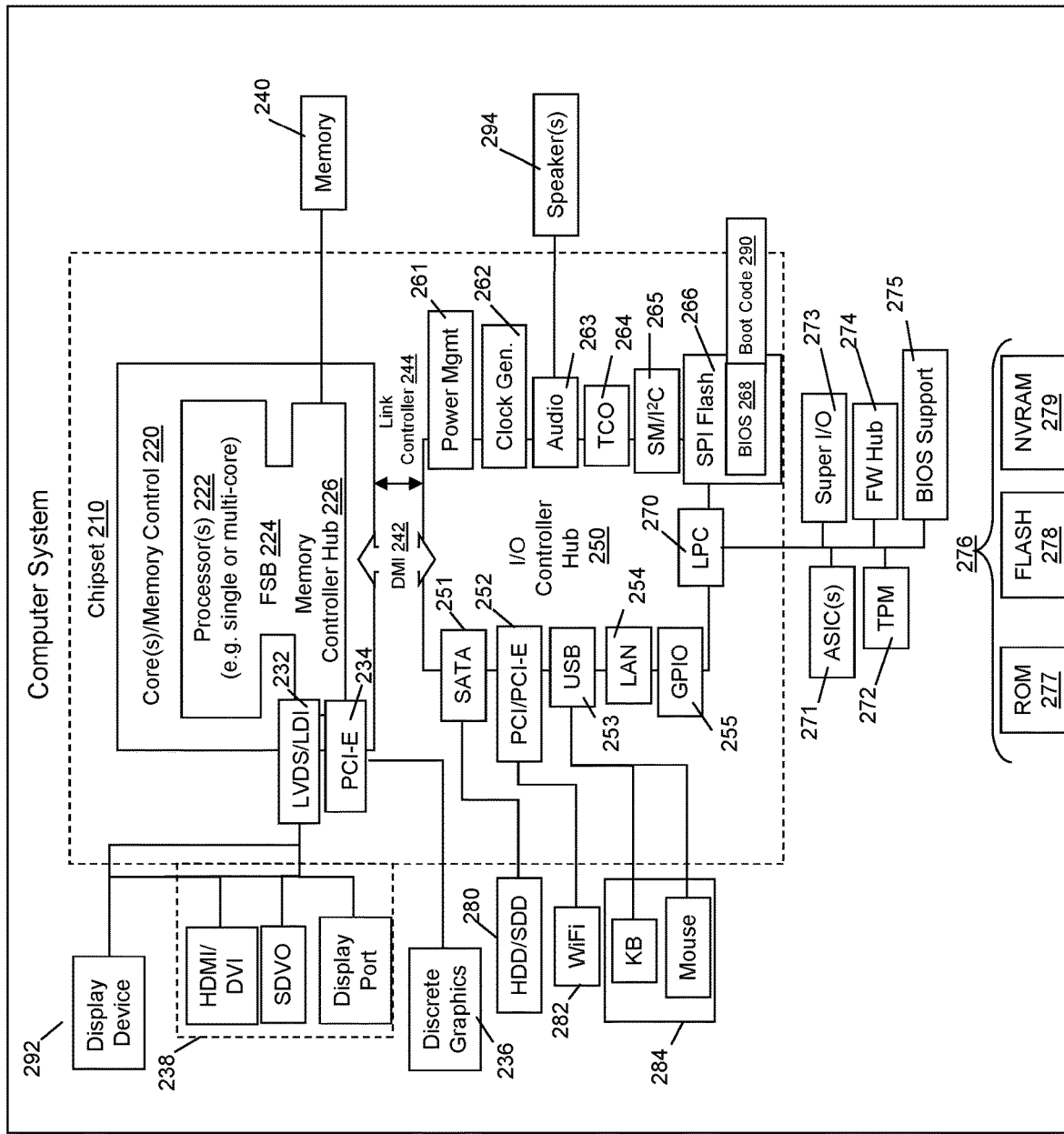
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as smart phones, tablets, personal computer devices generally, and/or electronic devices that are capable of creating digital media content. For example, the circuitry outlined in FIG. 1 may be implemented in a tablet or smart phone embodiment, whereas the circuitry outlined in FIG. 2 may be implemented in a laptop embodiment.

Figure 3:
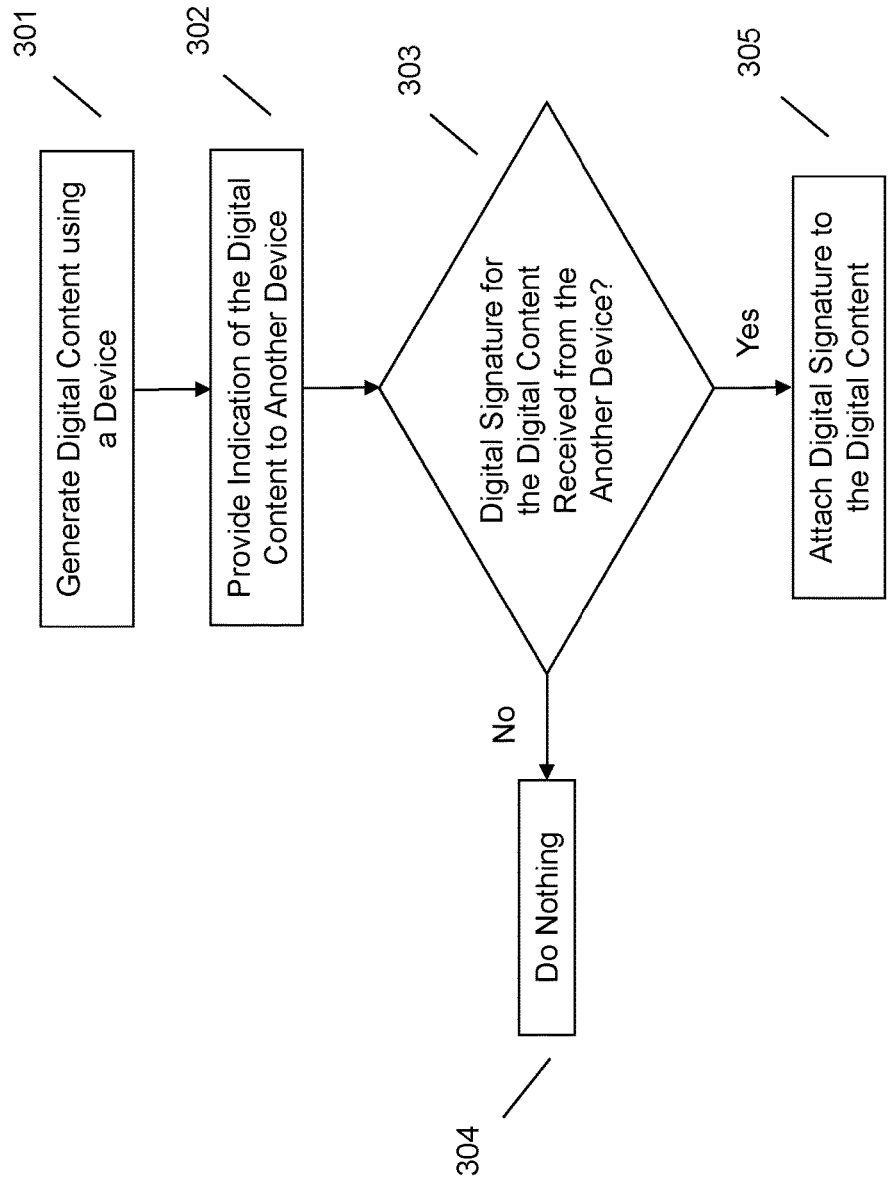
FIG. 3 illustrates an example method of validating digital content.

Referring now to FIG. 3, an embodiment may provide a method for validating a user's digital content creation. At 301, an embodiment may generate digital content at a device. In an embodiment, the digital content may be virtually any type of digital content (e.g., image content such as a photograph, video content, audio content such as song, a combination thereof, etc.). In an embodiment, the digital content may be created by a user via interaction with various elements of the device (e.g., depression of a shutter button to capture an image, interaction with a record button to capture a video or song, etc.).

At 302, an embodiment may provide an indication of the digital content to at least one other device (i.e., at least one other validating device). In the context of this application, a validating device may refer to another user's device (e.g., mobile device, stationary device, etc.), or alternatively, may refer to a static, network device such as a router associated with a public business or organization. In an embodiment, the indication may comprise a request for the validating device, or user associated with the validating device, to validate the digital content via provision of a digital signature. Details regarding the request for validation are elaborated upon later in the disclosure. In an embodiment, the indication may comprise one or more types of information about the digital content such as what type of content it is (e.g., image content, video content, audio content, etc.), when/where it was alleged to be created, a presentation of the actual digital content, etc. Additionally, in an embodiment, the indication may also comprise identification data associated with the content-creating device and/or creator of the digital content. For example, as part of the indication an embodiment may include information about the identity of the content-creating device (e.g., "sent from John's Smartphone", etc.), the identity of the user (e.g., "digital content created by John Smith", etc.), and the like.

In an embodiment, the provision of the indication may be transmitted to the other validating devices using a wired or wireless transmission technique. For example, an embodiment may establish a wireless network connection (e.g., a WWAN connection, WLAN connection, etc.) with one or more other devices and, responsive to the establishment, broadcast the indication through the wireless network. An embodiment may be configured to establish the wireless network connection at a predetermined time, for example, at the moment the digital content is created, responsive to a user command to transmit the digital content, etc.

In an embodiment, the indication may only be transmitted to specific devices. More particularly, one or more other devices must be opted-in, or authorized, to receive content creation transmissions. For example, a user of a validating device may adjust their settings to allow for receipt of content creation transmissions. The setting adjustment may occur prior to the transmission or substantially during it (e.g., the validating device may output a notification informing the validating user that a content creation transmission is being received and querying the validating user whether they want to accept or view it, etc.). Alternatively, an embodiment may indiscriminately transmit the indication to all devices within a predetermined range of the user device. For example, an embodiment may transmit the indication to all devices located within the device's transmission range, within a predetermined distance from the device, located at the device's geographic location, etc.

Responsive to receiving the indication of digital content, the validating device, or user of the validating device, may be prompted to validate the digital content via provision of a digital signature. In an embodiment, the digital signature may comprise one or more types of data such as a signing time, a signing location (e.g., determined using one or more location identification techniques such as Global Position System (GPS) identification, Wi-Fi triangulation, etc.), a signing date, a signing device type (e.g., a user device, a network device such as a router, etc.), other metadata, and the like. In an embodiment, responsive to providing a digital signature, the other device may transmit the digital signature back to the creator's device using a wired or wireless connection.

In an embodiment, the validation may occur automatically (i.e., without user review or interaction) or may require explicit user confirmation. In the case of the former, an embodiment may utilize public wireless networks and their modems to provide digital signature validation. More particularly, an embodiment may be connected to a public wireless network that has an Internet Protocol (IP) address, which may act as a signature during validation. Public networks may be, but are not limited to, security free Wi-Fi sources that may be commonly offered by businesses, e.g., coffee shops and libraries. In the case of the latter, the prompting may involve providing a visual push notification to the validating user requesting them to sign the content with a digital signature. The push notification may comprise information about the digital content (e.g., content creator identity, content type, etc.) and/or may comprise an actual copy of the digital content. Regarding the latter, a copy of the digital content may be helpful to a validating user in making their determination. For example, if the digital content was a picture of an object inside of a store and the validating user is unable to locate the object in the store or identifies that the interior of the store in the picture is different from the store that they are in, the validating user may decide to not provide a digital signature. As another example, a validating user may recognize that the location where the content was alleged to have been created is different than the current location of the validating user. In such a situation a user may also decide to not provide a digital signature.

Responsive to not receiving, at 303, a digital signature from a validating device, an embodiment may, at 304, take no further action and/or attempt to rebroadcast the indication. Conversely, responsive to receiving, at 303, the digital signature from a validating device, an embodiment may attach, at 305, the digital signature to the digital content. In an embodiment, an indication that a digital signature is attached to an article of digital content may be made visible to viewers of the digital signature. Alternatively, an embodiment may store this information in a non-visible location, such as in any metadata associated with the digital content.

In an embodiment, a situation may arise where multiple validating devices have provided a digital signature for the digital content. In an embodiment, if comprising substantially the same data (e.g., same time data, same location data, etc.) or separate but non-conflicting data (e.g., one digital signature comprises time data, another digital signature comprises location data, etc.), the digital signatures from all of the validating devices may be attached to the digital content. In such a case, an embodiment may record in a visible or non-visible record (e.g., displayed at a location proximate to the digital content, stored in the metadata associated with the digital content, etc.) that multiple devices have signed the digital content. Additionally or alternatively, in another embodiment, the record may also identify the types of validating devices that have signed the digital content. For example, an embodiment may record that a particular article of digital content was signed by a single router and four other mobile devices belonging to individual users.

In a situation where the digital signatures from the multitude of other validating devices comprise conflicting information (e.g., the digital signature of one validating device comprises a location that is different than the digital signature from another validating device, etc.), an embodiment may choose to prioritize certain digital signatures over others. For instance, an embodiment may prioritize the type of information in the digital signatures based on the validating device type. For example, for digital signatures that comprise location data, an embodiment may prioritize location data received from stationary validating devices such as routers over location data received from more mobile validating devices such as smart phones or tablets. As another example, an embodiment may choose to prioritize digital signatures provided by long-term, or authorized, validating devices over short-term or non-authorized validating devices. In an embodiment, the lower priority digital signatures may be unutilized or ignored.

The various embodiments described herein thus represent a technical improvement to conventional digital content validation techniques. Using the techniques described herein, an embodiment may generate digital content using a device. An embodiment may then transmit an indication of the digital content to one or more validating devices. The indication may comprise a variety of different types of information about the digital content, among them, a request by the creator's device to sign the digital content with a digital signature. Responsive to receiving the indication, a validating device, or a user associated with a validating device, may choose to provide the digital signature. If a digital signature is provided by the validating device and received at the content-creating device, an embodiment may attach the digital signature to the digital content (e.g., as part of metadata associated with the digital content, etc.). Such a method may prevent digital content from being copied or plagiarized. Additionally, such a method eliminates the need for a creator to sign or watermark their published content.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, a system, apparatus, or device (e.g., an electronic, magnetic, optical, electromagnetic, infrared, or semiconductor system, apparatus, or device) or any suitable combination of the foregoing. More specific examples of a storage device/medium include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
    generating, using and at an information handling device, digital content;
    providing an indication of the digital content to at least one other device, wherein the at least one other device is an authorized validation device within a predetermined range of the information handling device, wherein the authorized validation device is authorized to receive content creation transmissions within the predetermined range prior to the providing;
    receiving, at the information handling device, from the at least one other authorized validation device, and responsive to the at least one other authorized validation device validating the digital content, one or more digital signatures for the digital content, the one or more digital signatures providing an indication that a user other than a user of the information handling device has validated the digital content, wherein the one or more digital signatures comprise at least one piece of metadata selected from the group consisting of: a signing time, a signing location, a signing date, a signing device type; and
    attaching the one or more digital signatures to the digital content, wherein attaching the one or more digital signatures comprises recording a type of the at least one other device validating the one or more device signatures.

2. The method of claim 1, wherein the indication comprises a request to validate the digital content.

3. The method of claim 1, wherein the indication comprises identification data associated with a user of the information handling device.

4. The method of claim 1, wherein the at least one other device comprises a plurality of other devices and wherein the receiving comprises receiving, from the plurality of other devices, a plurality of digital signatures for the digital content.

5. The method of claim 4, further comprising determining, using a ruleset, which of the plurality of digital signatures to assign to the digital content.

6. The method of claim 1, further comprising providing an indication of the digital signature attached to the digital content.

7. The method of claim 6, wherein the indication of the digital signature attached to the digital content comprises a visual indication.

8. An information handling device, comprising:
a processor;
a memory device that stores instructions executable by the processor to:
generate, using and at the information handling device, digital content;
provide an indication of the digital content to at least one other device, wherein the at least one other device is an authorized validation device within a predetermined range of the information handling device, wherein the authorized validation device is authorized to receive content creation transmissions within the predetermined range prior to the providing;
receive, at the information handling device, from the at least one other authorized validation device, and responsive to the at least one other authorized validation device validating the digital content, one or more digital signature for the digital content, the digital signature providing an indication that a user other than a user of the information handling device has validated the digital content, wherein the one or more digital signatures comprise at least one piece of metadata selected from the group consisting of: a signing time, a signing location, a signing date, a signing device type; and
attaching the one or more digital signatures to the digital content, wherein attaching the one or more digital signatures comprises recording a type of the at least one other device validating the one or more device signatures.

9. The information handling device of claim 8, wherein the indication comprises a request to validate the digital content.

10. The information handling device of claim 8, wherein the indication comprises identification data associated with a user of the information handling device.

11. The information handling device of claim 8, wherein the at least one other device comprises a plurality of other devices and wherein the instructions executable by the processor to receive comprise instructions executable by the processor to receive, from the plurality of other devices, a plurality of digital signatures for the digital content.

12. The information handling device of claim 11, wherein the instructions are further executable by the processor to determine, using a ruleset, which of the plurality of digital signatures to assign to the digital content.

13. The information handling device of claim 8, wherein the instructions are further executable by the processor to provide an indication of the digital signature attached to the digital content.

14. A method, comprising:
receiving, at an information handling device, digital content transmitted by another device, wherein the information handling device is an authorized validation device within a predetermined range of the another device, wherein the authorized validation device is authorized to receive content creation transmissions within the predetermined range prior to the providing;
signing, responsive to validating the digital content, the digital content with a digital signature, the digital signature providing an indication that a user other than a user of the another device has validated the digital content, wherein the digital signatures comprise at least one piece of metadata selected from the group consisting of: a signing time, a signing location, a signing date, a signing device type; and
transmitting the digital content signed with the digital signature to the another device.

15. The method of claim 14, wherein the signing comprises automatically signing the digital content responsive to receiving the digital content.

16. The method of claim 14, wherein signing comprises:
querying a user of the information handling device for digital signature authorization; and
signing, responsive to receiving the digital signature authorization from the user, the digital content.

* * * * *